3,832,163
PROCESS FOR CONTINUOUS SMELTING AND
CONVERTING OF COPPER CONCENTRATES
Nicholas John Themelis, Beaconsfield, Quebec, and George Clement McKerrow, Noranda, Quebec, Canada, assignors to Noranda Mines Limited, Toronto, Ontario, Canada
Filed Aug. 13, 1971, Ser. No. 171,705
Claims priority, application Canada, Feb. 1, 1971, 104,111
Int. Cl. C22b 15/00
U.S. Cl. 75—74
16 Claims

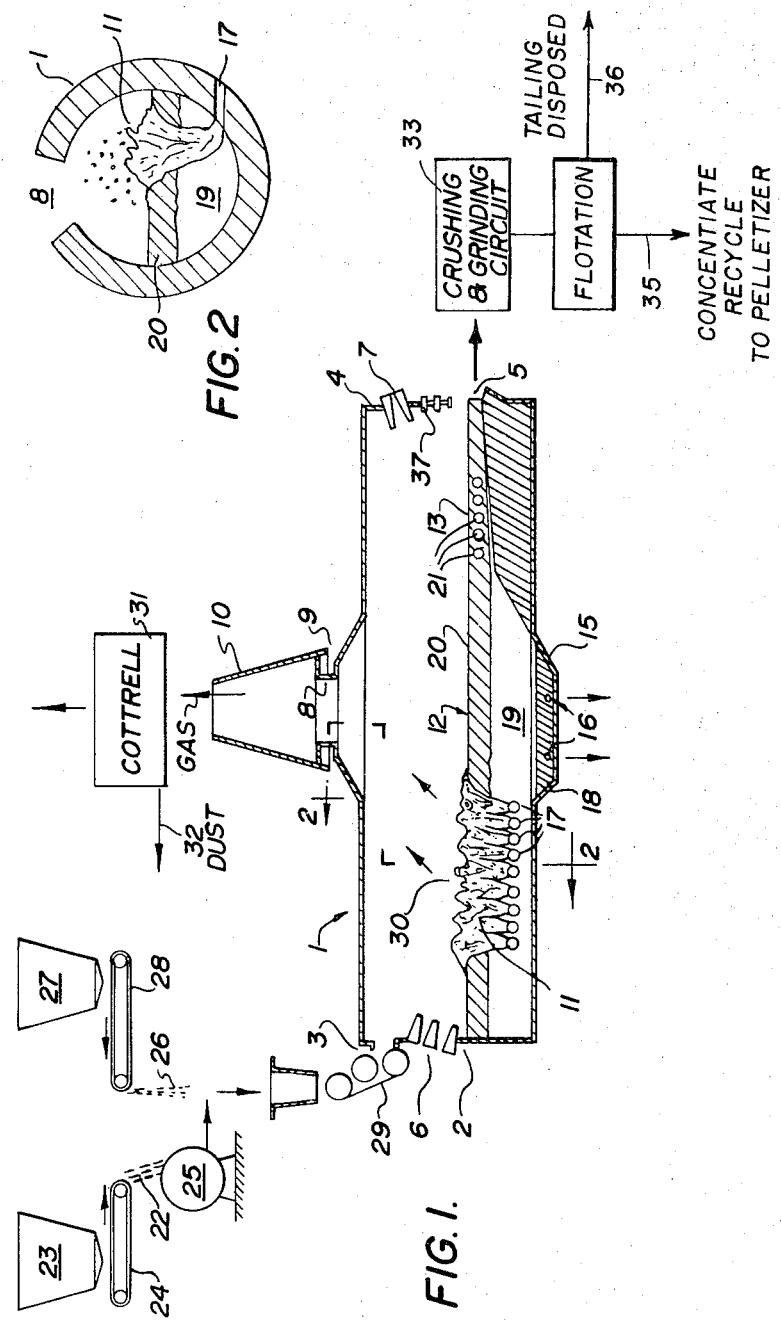

ABSTRACT OF THE DISCLOSURE

A process for the continuous smelting and converting of copper concentrates to metallic copper involves charging concentrates into a reactor which is maintained at a temperature at which a molten bath of slag, matte and metallic copper is formed. An oxidizing gas is injected into the molten bath and the charge of the concentrates is controlled in balanced relationship to an injection control rate of the gas such that the gas is sufficient to oxidize substantially all significant iron and sulphur in the concentrate so that smelting and converting is effected in the same zone of the reactor. The injection of the gas is such as to maintain a turbulent state of the molten bath and produce metallic copper. Slag and metallic copper are withdrawn from the reactor. The apparatus used for carrying out the process embodies a charging port, injection means, a copper settling area and a sump in the base thereof. Control means are provided for the oxidizing gas and means are also provided to control the introduction of concentrates through the charging port. Interlocking control means are adapted to control the introduction of oxidizing gas and the introduction of concentrates in a desired balanced relationship.

---

This invention relates broadly to the smelting and converting of copper concentrates to metallic copper. More particularly, the invention is directed to a process and apparatus for the continuous smelting and conversion of copper concentrates to metallic copper.

The object of the invention described herein is therefore to provide a process and an apparatus that will replace with advantage the conventional reverberatory and converter smelting process and apparatus. More particularly, the object of this invention is a continuous process wherein the smelting and converting stages occur in a reactor vessel which has no separate smelting and converting zones and into which the concentrates and an oxidizing gas are introduced continuously while slag and copper metal are removed continuously or at selected intervals.

Canadian Pat. 758,020 granted on May 2, 1967 to Noranda Mines Limited already describes a process for continuously smelting and converting copper concentrates wherein the smelting and converting takes place in the form of gradual and sequential reactions in a series of zones. This patent constitutes a basic breakthrough in the field of copper smelting and converting technology. The present invention is a further novel and unobvious development of the above-mentioned basic process and apparatus of continuously smelting and converting copper concentrates and constitutes a particularly advantageous and economical system.

It has been found that according to the new method of continuously smelting and converting copper concentrates, it is advantageous to perform the smelting and converting reactions in a single zone of the reactor. This has made it possible to increase the production capacity of the reactor for a given size and has substantially simplified the operation and control of the process. This development provides a marked technological advance not only with respect to presently known systems but even over the process and apparatus disclosed and claimed in applicant's own Canadian Pat. 758,020. Large scale pilot plant tests of the novel process and apparatus have demonstrated that this is an effective and economically advantageous industrial process which provides for continuous smelting and converting of copper concentrates.

For the purpose of comparison it may be noted that the conventional copper smelting and converting process involves melting the concentrates and flux in a reverberatory or blast furnace wherein two separate layers are formed—a heavier one of matte ($Cu_2S$—$FeS$) and a supernatant layer of slag. The supernatant layer is allowed to settle and is cleaned of most of its copper content. The matte from the reverberatory furnace is then conveyed to the converter vessel where it is subjected to a two-stage air-oxidation reaction. In the first stage of the converting reaction, oxygen reacts with FeS as follows:

$$FeS + 1\tfrac{1}{2}O_2 \rightleftharpoons FeO + SO_2 \qquad (1)$$

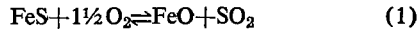

Any $Cu_2S$ which may be oxidized to $Cu_2O$ reacts immediately with FeS according to:

$$Cu_2O + FeS \rightleftharpoons Cu_2S + FeO \qquad (2)$$

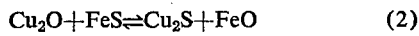

Silica flux is added to the converter continuously to form iron silicate slag with the FeO produced by reactions (1) and (2):

$$2FeO + SiO_2 \rightleftharpoons 2FeO \cdot SiO_2 \qquad (3)$$

The slag produced in the first stage of air-blow is then skimmed from the converter and transferred to the reverberatory furnace where mixing and interaction with the furnace bath lowers its copper content from 2–3% Cu to about 0.20 to 0.75% in the reverberatory slag.

The $Cu_2S$ (white metal) which has remained in the converter is then subjected to a second blow which is believed to result in the following reactions:

$$Cu_2S + 1\tfrac{1}{2}O_2 \rightleftharpoons Cu_2O + SO_2 \qquad (4)$$

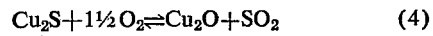

and $$2Cu_2O + Cu_2S \rightleftharpoons 6Cu + SO_2 \qquad (5)$$

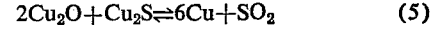

with the net result of producing metallic copper.

In an equilibrium system most of the FeS must be removed before any metallic copper can be precipitated according to Equation (5).

It should be noted that the word "zone" as used hereinafter refers to a generally horizontally-defined section of a molten bath, the parameters of which are roughly defined by the condition of the molten metal in that "zone," rather than to the use of physically dividing means.

The process according to the present invention can be described thermodynamically as a system in which a dynamic or non-equilibrium condition exists. Fresh concentrate is continuously smelted to matte, while in the same general zone of the reactor, white metal is continuously converted to copper although the molten matte contains more iron and sulphur than an equilibrium system of Cu—FeS. Violent agitation of the molten bath by air entering through tuyeres and the constant addition of fresh copper concentrates maintain the system in such non-equilibrium condition where smelting and different stages of converting all occur together in a single zone.

According to one aspect of the present invention a process for the continuous smelting and converting of copper concentrates to metallic copper in a reactor having three zones, namely a smelting and converting zone, a copper settling zone and a slag zone, comprises charging copper concentrates and flux generally into the smelting and converting zone of the reactor, maintaining the reactor at a temperature at which molten state of slag, matte and metallic copper will exist, injecting an oxidizing gas into the smelting and converting zone of the reactor so as to maintain a turbulent state substantially throughout said smelting and converting zone, controlling the rate of charge of said concentrates and flux in balanced relationship to the injection rate of said oxidizing gas so as to continuously oxidize substantially all iron and sulphur present in the concentrates, whereby both smelting and converting are effected in the same zone of the reactor and the depth of matte in the reactor is maintained at a predetermined level, continuously or intermittently withdrawing metallic copper and slag from discharge ports provided in the copper settling zone and the slag zone respectively.

According to another aspect of the present invention a process for the continuous smelting and converting of copper concentrates to metallic copper in a reactor having three zones, namely a smelting and converting zone, a copper settling zone and a slag zone, comprises charging copper concentrates and flux generally into the smelting and converting zone of the reactor, maintaining the reactor at a temperature at which molten state of slag, matte and metallic copper will exist, injecting an oxidizing gas into the smelting and converting zone of the reactor so as to maintain a turbulent state substantially throughout said smelting and converting zone, controlling the rate of charge of said concentrates and flux in balanced relationship to the injection rate of said oxidizing gas so as to continuously oxidize substantially all iron and sulfur present in the concentrates, whereby both smelting and converting are effected in the same zone of the reactor and the depth of matte in the reactor is maintained at a predetermined level, continuously or intermittently withdrawing metallic copper and slag from discharge ports provided in the copper settling zone and the slag zone respectively, and further comprises injecting natural gas into the slag in the slag zone.

According to yet another aspect of the present invention, a process for the continuous smelting and converting of copper concentrates to copper matte in a reactor having three zones, namely a smelting and converting zone, a copper matte settling zone and a slag zone, comprises charging copper concentrates and flux generally into the smelting and converting zone of the reactor, maintaining the reactor at a temperature above the melting point of the copper matte and at which molten state of slag and matte will exist, injecting an oxidizing gas into the smelting and converting zone of the reactor so as to maintain a turbulent state substantially throughout said smelting and converting zone and provide dynamic conditions in said zone, the charging of said concentrates and flux being done at a rate which is in balanced relationship to the injection rate of said oxidizing gas such as to continuously oxidize sufficient iron and sulphur in the concentrates to effect smelting and conversion of the concentrates into copper matte.

The invention will now be described in greater detail with reference to the appended drawings in which:

FIG. 1 is a schematic side view of a generally horizontally disposed reactor of the present invention and a schematic representation of other equipment used in conjunction with the reactor.

FIG. 2 is a view in cross-section of the vessel of FIG. 1.

Figure 3:
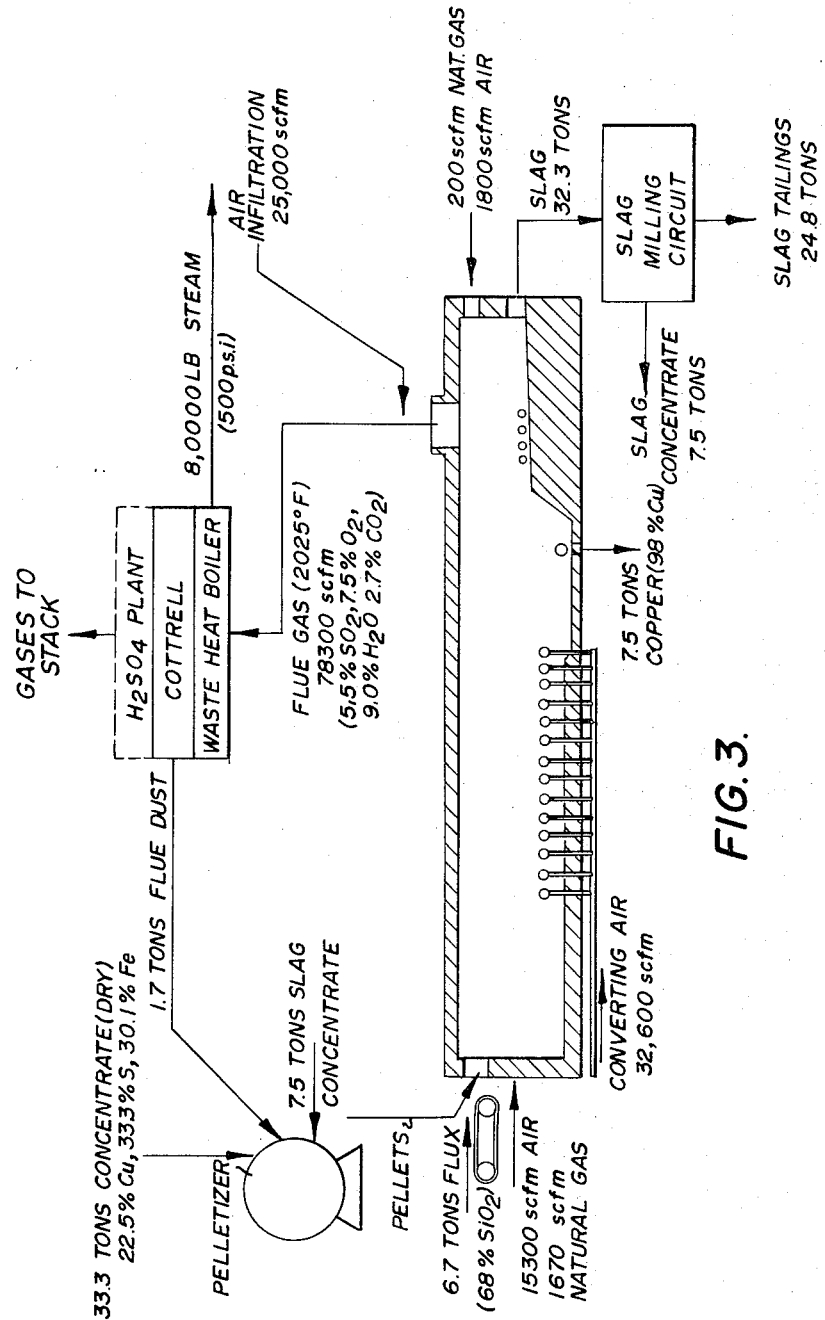
FIG. 3 is a diagram showing a material flowsheet for a commercial process plant capable of handling 800 tons per day of concentrate.

In FIG. 1 of the drawings the reactor 1 is a generally elongated cylindrical shaped furnace similar to a Pierce-Smith converter, which can be rotated about its longitudinal axis if desired. The charging end 2 of the reactor has a charging port 3 and the slag tapping end 4 has slag tap hole 5. A second charging port 37 may be provided at the slag tapping end 4 for the addition of concentrates or solid reductants in the slag area. Burners 6, 7 are respectively located at the charging end 2 and the slag tapping end 4 of the reactor. Part of the fuel of the burner 6 may be injected in the form of a spray or gas jet through the charging port 3 in order to utilize the oxygen in the air infiltrated through this port. An exhaust stack 8 (which is also called "mouth") is provided in the roof or what is normally the upper portion 9 of the reactor and hood 10 covers this exhaust stack 8 when the reactor is in an upright position. The reactor has three zones that may be generally described as smelting and converting zone 11, copper settling zone 12, and slag zone 13. A sump 15 and two copper tap holes 16 are provided in the copper settling zone 12. Tuyeres 17 are located along the bottom portion of the reactor in the smelting and converting zone 11.

In operation, the reactor contains a molten bath 30 with three liquid phases, a copper phase 18, a matte or sulphide phase 19, and a slag phase 20. The bath is deepest in the sump area and shallowest adjacent the slag tapping end. Tuyeres (or lances) 21 may be used to inject air or reducing gases into the slag in the slag cleaning area either continuously or at predetermined intervals.

Copper concentrate 22 is discharged continuously from a storage bin 23 by a controlled weight feeder 24 and pelletized in pelletizer 25. Small lumps ($\frac{1}{2}''$ to $1''$) of siliceous flux 26 are discharged from a storage bin 27 by a controlled feeder 28. Pelletized concentrate and flux are injected into the rector through charging port 3 and are spread over the surface of the molten bath 30 by slinger 29. Air or oxygen-enriched air is blown through tuyeres 17 which results in substantial turbulence and oxidation in the smelting and converting area 11 of the molten bath near the tuyeres 17.

Oxidation of the matte produces sulphur dioxide which passes out of the furnace along with other off-gases through exhaust stack 8 into hood 10. The off-gases pass through cottrell precipitator 31 where dust 32 is recovered for recycling. It should be noted that during the reaction, which is quite turbulent and violent in nature, a build-up forms around stack opening or mouth 8. This build-up, also called "collar," may reach a degree which will substantially restrict the flow of gas from the vessel, thus producing undesirable blow-back of the materials being fed into the reactor. Consequently, it has been found desirable to clean the mouth about once a day to keep it unobstructed. A particularly suitable way of effecting this cleaning operation is through the use of an oxy-fuel torch employing a fuel such as natural gas and oxygen. The flame developed by the torch has a temperature in the range of about 5000° F. and easily cuts off the produced build-up around the mouth 8 without any change or stoppage of the overall process. When the mouth has been so cleaned, it can easily be maintained open and unobstructed by periodic removal of the fresh build-up using mechanical means such as hammers or the like. In the material flowsheet of the commercial scale plant shown in FIG. 3, the off-gas passes through a waste heat boiler, and the $SO_2$ is recovered in a sulphuric acid plant. The controlled oxidation of the bath results in the formation of a copper phase 18 which is precipitated from the matte 19 into the sump 15, and a slag phase 20 formed on top of matte 19. Copper is tapped from sump 15 through copper tap holes 16. Slag 20 is tapped at intervals through slag tap hole 5, and allowed to cool slowly. It is then processed in crushing and grinding circuit 33 and passed into flotation circuit 34 where copper entrapped in the slag is recovered in slag flotation concentrate 35 and recycled to pelletizer 25. Slag flotation tailings 36 are discarded to waste.

As illustrated in FIG. 2, the air, or oxygen-enriched air, injected through each tuyere 17 projects into the copper sulphide matte bath in the form of a highly turbulent jet. In the upward flow of this jet, there is an exchange of momentum between the gas and the surrounding molten bath of matte and slag and large quantities of the matte and slag are entrained in the jet cone. The jet acts as a powerful mixing device pushing the liquid sulphide phase through the slag layer, from where it settles by gravity again into the copper sulphide layer. The energy of the jets is not dissipated completely in mixing the bath. Particles of liquid are carried with the gas above the surface of the bath in the form of liquid spouts and droplets.

Heat, which is generated in the matte by the converting reactions and the intense mixing action around the tuyeres, maintains the bath in turmoil and thus provides the required high heat transfer rates from the copper sulphide matte to the slag phase and to the concentrates charge on the surface of the bath.

The feed particles which are being continuously scattered widely over the surface of the molten bath, substantially remain as individual lumps until they are absorbed into the molten bath and the high surface area per unit volume of charge thus contributes to the reactor's high smelting rate.

It is not intended to suggest that complete continuity of introduction of feed material and air is absolutely essential in the successful operation of this process. Small changes in air flow and stoppages in the feed materials would not be critically or seriously detrimental but the continuous aspect of this process is to be distinguished from the separate blows used in production of copper by conventional batch processes.

Under normal operating conditions, the rate at which air or oxygen-enriched air is blown through the tuyeres and the rate at which concentrates are injected into the reactor are so controlled that the supply of oxygen is just sufficient to oxidize all the added iron and sulphur in addition to any other non-copper oxidizable elements, thus continuously producing copper and slag while the volume of matte in the reactor remains constant. At the same time the rate of flux addition is controlled proportionally to the air and concentrate input rates.

The molten copper and the slag are tapped off at convenient intervals or continuously so that the levels of the molten copper, matte, and slag remain within the desired operating levels in the reactor. For example, in the pilot plant reactor copper was tapped down to a level of 4 to 5 inches above the bottom of the sump after the level of the copper had risen to 10 to 12 inches. If the copper level is allowed to rise too far, copper enters the tuyeres, making punching of the tuyeres more difficult. On the other hand, if the copper is tapped out completely, the blister copper contains some matte. In the pilot reactor, the matte is normally maintained at a thickness of 29 to 34 inches with the upper level of the matte at the height of 39 to 44 inches above the sump. The tuyeres are 21 inches above the bottom level of sump and thus air enters the molten bath in the lower portion of the matte phase. These dimensions are, of course, not limitative.

By introducing the air a sufficient depth below the surface of the matte, 95% to 100% (generally approaching 100%) of the oxygen reacts with the matte. Consistent high utilization of oxygen makes it possible to predict accurately the amount of air required for each ton of concentrate of a particular composition.

Although some unconverted copper sulphide leaves the reactor entrapped in slag or flue gas, this does not significantly interfere with the control of air and feed.

If the ratio of the air to feed is increased to provide more than enough air to oxidize all the new concentrate, the excess air converts more copper sulphide to copper, thus depleting the matte phase. If the matte phase increases above its optimum depth, it can be reduced by increasing the ratio of air flow rate to concentrate feed rate to the reactor.

On the other hand, if the ratio of air to concentrate is decreased to provide less than enough air to oxidize all the new concentrate, copper production would decrease or even stop and the depth of the matte layer would increase.

A further decrease in the air to concentrate ratio would eventually result in copper from the metallic copper phase reacting with the matte and decreasing the volume of the metallic copper.

The required amount of air per unit charge of concentrate is calculated according to the composition of the concentrate and the feed rate into the reactor. In the pilot reactor, the levels of copper, matte and slag phases are measured every hour to determine if there is any deviation between the predicted operation of the furnace and the actual operation. Any slight changes in level found in the hourly depth measurement are adjusted by appropriately changing the ratio of air to concentrate.

In the operation of the pilot plant reactor, the concentrate feed rate and the flux feed rate are at all times automatically controlled proportionally to the tuyere air rate. If any of the tuyeres become blocked or if there are variations in the pressure of air source, the amount of air to the reactor may fluctuate. However, the rate of feed and flux addition is closely controlled by the automatic feeders to maintain the required air to concentrate and air to flux ratios. In plants where a constant air rate can be obtained, a different control system may be used.

Under normal operating conditions, most of the required heat is supplied by oxidation of the sulphides in the concentrate. In the pilot plant it is however necessary to supplement this heat by burning fuel in the reactor; in a commercial plant a lesser quantity of such fuel would be needed, while the use of oxygen-enriched air substantially reduces the amount of fuel required, produces flue gases having a higher concentration of $SO_2$ gas which are more suitable for manufacture of $H_2SO_4$ and also permits a higher production capacity for a given size of reactor. These advantages must be weighed against the costs of an oxygen plant.

The feed to the pilot plant reactor contains about 25% copper and about 30% iron. Down to a certain level, iron sulphides oxidize before the copper sulphides, and under typical operating conditions the matte bath on the average contains about 3% Fe, the rest of the matte being copper sulphide and the usual impurities.

An important and unobvious feature of this invention is that such a bath under equilibrium conditions would not be expected to precipitate copper. Under such conditions the Fe content of the matte must be much lower than 3% (closer to 0.5%) before metallic copper precipitates from the matte.

It is thought that, in accordance to the novel process, in the area of violent agitation around the air jets the matte bath is depleted in iron and sulphur to such low levels that production of metallic copper becomes possible. Some metallic copper settles out of the matte into the sump.

Silica is added to the feed as flux to obtain a ratio of $Fe/SiO_2$ from 1.6/1 to 1.9/1 in the slag but tapping of the slag does not become difficult until the $Fe/SiO_2$ ratio reaches about 2.1/1. If the slag is allowed to stagnate near the slag tapping port, a viscous layer of slag may form over the top of the fluid slag. Tuyeres or lances may be used in the slag zone to promote mixing of the slag and to prevent the formation of such a layer. A low silica slag is preferred because it produces a smaller volume of slag to be milled.

In spreading concentrate over the surface of the molten bath some concentrate may fall in the slag end of the reactor. Also, the process provides for the addition of a fraction of the concentrate charge in the slag zone by means of a second feeder installed at the slag end wall of the reactor. By adding and smelting a fraction of the concentrate input in the slag end of the reactor, some of the magnetite and copper content of the slag can be reduced and the fluidity of the slag is improved. The slag-end feeder may be used in addition to the main feeder, at the discretion of the operator.

The preferred operation of the pilot plant provides for tapping of the slag with a high copper content, and for treating this slag by milling and flotation to recover a high grade copper concentrate which is recycled to the reactor.

The copper present in the slag is mainly metallic although some of the copper is in the form of copper sulphide. Milling and flotation tests have shown that the tailing grade from the slag is substantially independent of the head assay of the slag. This is contrary to the experience with milling of natural ores where the tailing grades and the concentration ratio usually vary according to the head assay of the ore, other factors remaining constant. Slags are slow-cooled to allow for the precipitation of dissolved copper and for the growth of fine particles of copper into larger particles.

The amount of copper contained in the tapped slag is not a critical factor since treatment of the slag by milling and flotation will reduce the amount of copper lost in the tailings from the treated slag to a predetermined value, irrespective of whether the tapped slag has a high content of copper or a low content of copper.

Table 1 at the end of the disclosure shows the results of various milling and flotation tests conducted on slags. The last column of Table 1 shows that the copper lost in the tails as a percentage of the copper input to the reactor falls within a moderately narrow range, although the copper content of the head material (column 3) covers a wide range of values.

Large scale milling tests have shown that slag from the pilot plant reactor can be ground by conventional grinding or by autogenous grinding.

The ratio of concentration (column 6 of Table 1) from the milling and flotation of the slag is in the order of 4.5 to 5.5 for slags containing 10% to 12% copper. The concentrate had a copper content of 50% to 60%.

The apparatus of the present invention is not limited to any particular size or shape of reactor, but the pilot plant reactor of Noranda Mines Limited is a good example of a workable apparatus. The Noranda pilot plant reactor is similar to a Pierce-Smith converter and can be rotated to bring the tuyeres out of the bath, or if necessary in an emergency, to discharge the molten bath through the mouth 8 of the reactor.

The reactor is fitted with thirteen standard 2-inch air tuyeres with centres 6 inches apart and at 21 inches above the bottom of the sump. The row of tuyeres starts more than six feet out from the feed end of the reactor. If the tuyeres were closer to the feeding port, the violent agitation of the tuyeres could splash molten material out the feeding port. As few as four and as many as twelve of these tuyeres may be used, although normally eight tuyeres are used and supplied with oxidizing gas at about 15 psig.

The pelletized feed material contains from about 2 to 15% moisture. Uniform sized pellets are not necessary. The reactor can be fed unpelletized material; however, it results in slightly greater dust carry-over in the off-gases.

The present invention can be further illustrated by samples of data obtained from extensive pilot plant testing of this Noranda Mines' reactor.

Table 2 shows the chemical analysis of four different types of copper concentrate smelted and converted in the reactor and the analysis of the slag and blister copper produced from these four concentrates. There was no significant difference between the analysis of the four samples of blister copper although the composition of the concentrates from which they were produced was quite different.

The analysis of the four slag samples showed considerable variation. The variations in copper content were not due to the variations in chemical content of the concentrates, but rather were related to the operating conditions within the reactor. A higher silica content in the feed generally resulted in less magnetite in the slag.

The copper produced in the reactor can be oxidized and then poled by the same technique as used in the conventional smelting to produce anode copper.

The automatic proportional control of the rates of concentrates, flux, and air flow to the reactor can be adjusted for various grades of concentrates. The fuel input to the burners is automatically adjusted, by means of an electronic pyrometer, to compensate for any decrease or increase in the heat of converting reactions of the concentrate feed to the reactor.

Copper scrap from anodes and other sources can be charged to the reactor by means of a gate in the hood of the reactor. The scrap material can be charged intermittently through the gate into the liquid bath where it is melted and settles into the copper sump. During the melting operation, the fuel input to the burner is increased automatically to compensate for the heat of melting the scrap.

The details provided in Table 3 will be self-explanatory and the pilot plant reactor operation under three different conditions can be seen therefrom. These conditions included one period of smelting and converting with air, a second period of smelting and converting with oxygen-enriched air, and the third with air while recirculating and mixing slag concentrate with new feed entering the reactor.

The use of oxygen-enriched air increases the tons per hour of the concentrate smelted proportionally to the oxygen input. The tons per hour of dry concentrate put through the furnace was about 20% higher while using oxygen-enriched air.

Temperatures ranged from 2100° F. to 2350° F., but normal operation was at about 2250° F.

During the operation of the furnace using a charge containing recycled slag concentrate, the heat balance of the furnace was altered somewhat. The ratio of the fresh concentrate to recycled slag concentrate averaged about 5:1. Although the amount of recycled slag concentrate was relatively small compared to the amount of fresh concentrate, the recycled concentrate was low in sulphur but very high in copper content. As a result the average production of copper, while slag concentrate was being recycled, was almost twice the rate of production of copper while only fresh concentrates were introduced in the feed material.

Since the specific heat of copper is low compared to slag, the recirculation of slag concentrate with a high copper content had only a small effect on the heat balance of the reactor and raised only slightly the fuel consumption of the burners.

As an alternative to the milling and flotation treatment of slag the present invention also envisages the treatment of slag by reducing gas or other means with the purpose of reducing the copper content either in an appropriate extension of the reactor itself or in a separate furnace. For example, a separate holding furnace may be provided into which high copper slag is skimmed or tapped from the reactor. The slag is then reduced by subjecting it to a blow with reducing gases and treated with iron or copper sulphides such as pyrite, pyrrhotite or chalcopyrite, and allowed to settle in order to recover its copper content in the form of a settled high grade matte which is tapped from the bottom of the holding furnace. This matte may be recirculated to the reactor.

As a result of the extensive development of the pilot plant reactor, a commercial size reactor has been designed for treating 800 tons of dry concentrate per day. A material flowsheet of this commercial size reactor is shown in FIG. 3.

The process and apparatus of this invention therefore represent a significant advance in the practical aspects of the continuous smelting and converting of copper concentrates to metallic copper.

TABLE 1.—MILLING OF NORANDA PROCESS SLAG

| Description of slag | Percent Fe₃O₄ in slag | Grind percent −325 mesh | Percent copper content in— | | | Concentration ratio head/concentrate | Copper loss in tailing as percent of copper input to reactor |
|---|---|---|---|---|---|---|---|
| | | | Head | Concentrate | Tailing | | |
| Slag produced during oxygen-enrichment run, cooled in 150 lbs. pig mould | 32 | 90.0 | 11.3 | 58.5 | 0.54 | 5.46 | 1.64 |
| Large scale milling test (ball mill grinding) | 20–26 | 91.1 | 11.4 | 51.5 | 0.50 | 4.54 | 1.47 |
| Large scale milling test (autogenous grinding) | 20–26 | 90.0 | 11.4 | 52.1 | 0.53 | 4.74 | 1.58 |
| Noranda process slag reduced with coal and SiC subjected to deoxidizing in pot furnace | 18 | 84.0 | 3.9 | 43.6 | 0.67 | 13.73 | 2.20 |
| Do | 12 | 97.4 | 2.4 | 30.2 | 0.59 | 18.30 | 1.94 |
| Noranda process slag subjected to deoxidizing treatment in pilot plant reactor | 12 | 89.2 | 2.2 | 19.8 | 0.54 | 11.70 | 1.71 |
| Do | 12 | 95.9 | 2.2 | 21.4 | 0.54 | 12.40 | 1.73 |
| Noranda process slag subjected to deoxidizing treatment in pot furnace | 6 | 80.4 | 1.4 | 6.1 | 0.44 | 6.10 | 1.25 |
| Do | | 97.4 | 1.6 | 12.1 | 0.36 | 10.40 | 1.12 |

TABLE 2.—TYPICAL FEED SAMPLES

| | Percent of— | | | | | |
|---|---|---|---|---|---|---|
| Type | Cu | Fe | S | SiO₂ | Zn | Pb |
| 1 | 23.7 | 28.6 | 27.6 | 8.2 | 0.4 | 0.9 |
| 2 | 22.5 | 32.3 | 27.8 | 7.0 | 1.4 | 0.17 |
| 3 | 23.5 | 28.5 | 33.6 | 3.3 | 5.9 | 1.23 |
| 4 | 28.2 | 27.5 | 33.6 | 2.4 | 7.2 | .52 |

SLAG PRODUCED (FROM ABOVE FEED SAMPLES)

| | Percent of— | | | | | |
|---|---|---|---|---|---|---|
| Type | Cu | Fe | SiO₂ | Zn | Pb | Fe₃O₄ |
| 1 | 7.9 | 39.3 | 25.4 | 1.1 | 0.33 | 19.7 |
| 2 | 9.2 | 40.5 | 24.5 | 0.9 | 0.11 | 20.0 |
| 3 | 10.7 | 35.5 | 22.0 | 5.5 | 0.57 | 22.8 |
| 4 | 11.0 | 32.8 | 24.8 | 7.8 | 0.61 | 26.0 |

BLISTER COPPER PRODUCED (FROM ABOVE FEED SAMPLES)

| | Percent of— | | | | |
|---|---|---|---|---|---|
| Type | Cu | Fe | S | Zn | Pb |
| 1 | 97.4 | 0.3 | 1.50 | 0.1 | .08 |
| 2 | 97.4 | 0.2 | 1.80 | 0.0 | .03 |
| 3 | 97.7 | 0.1 | 1.50 | 0.1 | .15 |
| 4 | 97.5 | 0.1 | 1.30 | 0.0 | .10 |

TABLE 3

| | Air blowing | Recycling slag concentrate | Oxygen enrichment |
|---|---|---|---|
| Total hours on stream | 549 | 345 | 289 |
| On stream time as percent of total time | 89 | 92 | 81 |
| Concentrate (dry) fed (average tons/hour) | 4.00 | 3.85 | 4.78 |
| Recycled concentrate (average tons/hour) | | 0.78 | |
| Flux fed (average tons/hour) | 0.78 | 0.775 | 1.07 |
| Copper produced (average tons/hour) | 0.458 | 0.825 | 0.353 |
| Slag produced (average tons/hour) | 3.14 | 3.20 | 3.89 |
| Flue dust produced (average tons/hour) | 0.24 | 0.23 | 0.29 |
| Air blowing (average s.c.f.m.) | 3,421 | 3,755 | 2,835 |
| Oxygen blowing (average s.c.f.m.) | | | 211 |
| Percent O₂ in enriched air | | | 26.3 |
| Fresh wet charge (moist) (tons/hour) | 5.0 | 4.8 | 6.0 |
| Total wet charge (including recycled concentrate) (tons/hour) | 5.0 | 5.58 | 6.0 |
| Fuel mm. B.t.u./dry ton fresh conc | 6.04 | 6.16 | 2.62 |
| Fuel mm. B.t.u./wet ton fresh charge | 4.84 | 4.90 | 2.10 |
| Product analysis (typical not average); concentrate, percent: | | | |
| Copper Cu | 22.8 | 23.6 | 25.0 |
| Iron Fe | 28.0 | 29.5 | 27.4 |
| Silica SiO₂ | 3.9 | 3.0 | 2.6 |
| Sulphur S | 33.6 | 33.7 | 37.4 |
| Recycled slag percent | 51.3 | | |
| Concentrate copper; flux, percent: | | | |
| Silica SiO₂ | 66.6 | 67.2 | 67.7 |
| Iron Fe | 6.1 | 5.6 | 5.4 |
| Slag, percent: | | | |
| Copper | 10.0 | 10.5 | 11.8 |
| Iron | 35.7 | 36.4 | 34.6 |
| Silica | 22.5 | 22.1 | 21.1 |
| Sulphur | 1.0 | 1.1 | 1.4 |
| Copper (blister), percent: | | | |
| Copper | 97.5 | 97.9 | 97.6 |
| Iron | 0.3 | 0.1 | 0.2 |
| Sulphur | 1.6 | 1.4 | 1.4 |

The embodiments of the invention in which an exclusive property or privilege is claimed are defined as follows:

1. A process for the continuous smelting and converting of copper concentrates to metallic copper in a reactor having three zones, namely a smelting and converting zone, a copper settling zone and a slag zone, comprising:
 (a) charging copper concentrates and flux generally into the smelting and converting zone of the reactor;
 (b) maintaining the reactor at a temperature above the melting point of copper and at which molten state of slag, matte and metallic copper will exist;
 (c) injecting an oxidizing gas into the smelting and converting zone of the reactor so as to maintain a turbulent state substantially throughout said smelting and converting zone and provide dynamic conditions in said zone;
 (d) the charging of said concentrates and flux being done at a rate which is in balanced relationship to the injection rate of said oxidizing gas such as to continuously oxidize substantially all iron and sulphur present in the concentrates, whereby both smelting and converting are effected in the same zone of the reactor and the depth of matte in the reactor is maintained at a predetermined level, while the amount of the matte in the reactor is maintained substantially constant;
 (e) continuously or intermittenly withdrawing metallic copper and slag from discharge ports provided in the copper settling zone and the slag zone respectively; and
 (f) maintaining the rate of copper input in the concentrate generally constant with time and substantially equal to the rate of total copper output from the reactor.

2. Process as claimed in claim 1, wherein the oxidizing gas is so injected into the smelting and converting zone that over 95% of the oxygen content of the oxidizing gas reacts in said smelting and converting zone.

3. Process as claimed in claim 1, wherein the charged concentrates are pelletized and admixed with the flux prior to charging into said reactor.

4. Process as claimed in claim 1, wherein the charged concentrates are admixed with the flux and with recirculated treated slag concentrates prior to charging into the reactor.

5. Process as claimed in claim 1, wherein the oxidizing gas is injected into a generally lower portion of matte layer in the smelting and converting zone.

6. Process as claimed in claim 1, wherein the charged concentrates are spread over a large area of the molten surface in the smelting and converting zone.

7. Process as claimed in claim 1, wherein the slag recovered from the process is slow-cooled.

8. Process as claimed in claim 1, wherein the slag recovered from the process is ground by autogenous grinding.

9. Process as claimed in claim 1, wherein the slag recovered from the process is ground, then subjected to flotation and the resulting concentrate is recirculated to the reactor.

10. Process as claimed in claim 1, wherein metallic copper and slag are withdrawn in such a manner that the metallic copper, matte, and slag layers are maintained within predetermined levels.

11. Process as claimed in claim 1, further comprising injecting air or reducing gas into the slag in the slag zone.

12. Process as claimed in claim 1, further comprising injecting natural gas into the slag in the slag zone.

13. Process as claimed in claim 1, wherein the content of Fe in the matte is maintained at about 3%.

14. Process as claimed in claim 1, wherein the oxidizing gas injected into the smelting and converting zone of the reactor is air or oxygen enriched air.

15. Process as claimed in claim 1, wherein a solid reductant or some concentrates are also charged into the slag zone of the reactor.

16. A process for the continuous smelting and converting of copper concentrates to copper matte in a reactor having three zones, namely a smelting and converting zone, a copper matte settling zone and a slag zone, comprising:
(a) charging copper concentrates and flux generally into the smelting and converting zone of the reactor;
(b) maintaining the reactor at a temperature above the metling point of the copper matte and at which molten state of slag and matte will exist;
(c) injecting an oxidizing gas into the smelting and converting zone of the reactor so as to maintain a turbulent state substantially throughout said smelting and converting zone and provide dynamic conditions in said zone;
(d) the charging of said concentrates and flux being done at a rate which is in balanced relationship to the injection rate of said oxidizing gas such as to continuously oxidize sufficient iron and sulphur in the concentrates to effect smelting and conversion of the concentrates into copper matte.

References Cited

UNITED STATES PATENTS

| | | | |
|---|---|---|---|
| 3,437,475 | 4/1969 | Themeus et al. | 75—74 |
| 3,281,236 | 10/1966 | Meissner | 75—73 |
| 3,473,918 | 10/1969 | Foard | 75—73 |
| 3,682,623 | 8/1972 | Dierckx | 75—78 |
| 3,664,828 | 5/1972 | Worner | 75—73 |
| 3,326,671 | 6/1967 | Worner | 75—73 |
| 3,561,951 | 2/1971 | Themeus et al. | 75—73 |
| 3,700,431 | 10/1972 | Themeus et al. | 75—73 |

FOREIGN PATENTS

| | | | |
|---|---|---|---|
| 1,183,715 | 3/1970 | Great Britain | 75—73 |

WALTER R. SATTERFIELD, Primary Examiner

U.S. Cl. X.R.

75—72, 76